(No Model.)
H. K. AUSTIN.
COMBINATION SQUARE.
No. 490,893. Patented Jan. 31, 1893.
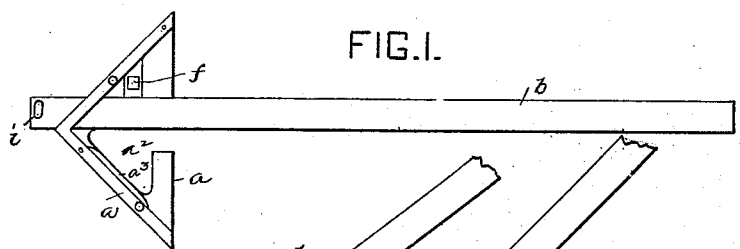
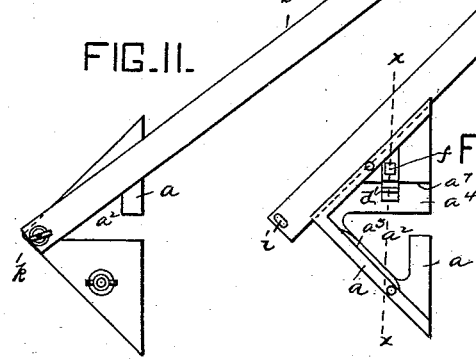
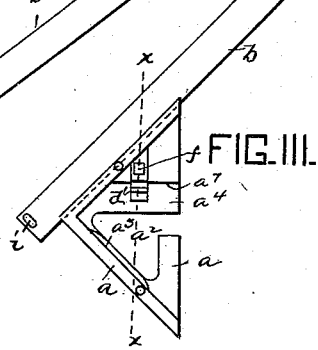
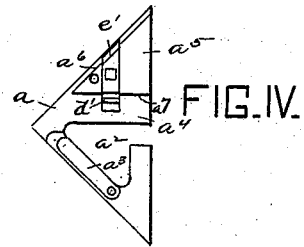
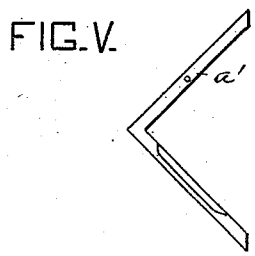
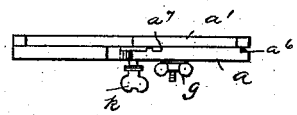
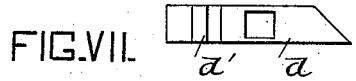
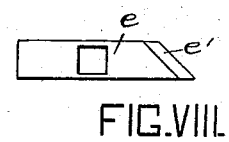
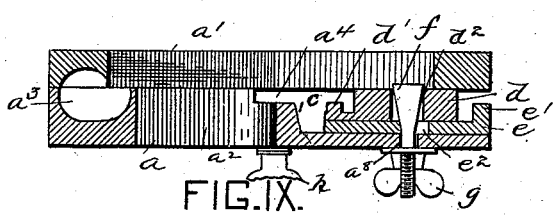
WITNESSES:
INVENTOR,
Henry K. Austin

UNITED STATES PATENT OFFICE.

HENRY K. AUSTIN, OF READING, MASSACHUSETTS.

COMBINATION-SQUARE.

SPECIFICATION forming part of Letters Patent No. 490,893, dated January 31, 1893.

Application filed April 18, 1892. Serial No. 429,537. (No model.)

*To all whom it may concern:*

Be it known that I, HENRY K. AUSTIN, of Reading, in the county of Middlesex and State of Massachusetts, have invented certain new and useful Improvements in Combination-Tools, of which the following is a specification.

My invention which is an improvement on my patent No. 305,993, dated September 30, 1884, relates to an improved instrument for the use of machinists and others; and has for its object to provide a tool which will be convertible from a T or center square, into a miter or try-square or which can be used for any angle at will.

My invention consists broadly of a suitable head or frame in which the straight edge or blade is supported. This head is composed of a main frame having a top plate adapted to be secured to the head and retain the blade in suitable slots or grooves in said head. A perforation in said blade is adapted to accommodate a set screw whereby the blade may be adjusted to any angle without regard to the slots or grooves. The configuration of this head is preferably that of a right angle triangle and is so shown in the drawings hereto annexed. On lines at right angles to the hypotenuse, a recess is cut out of the head of sufficient depth and width to permit the insertion of the blade or rule, in which position the tool is used as a T or central square. A slot or groove is formed on one of the right angle sides of the head in which the blade or rule may be inserted and slide, making a miter or try-square. A perforation in said blade further permits the insertion of the clamping screw when the blade is to be set at other angles. For a purpose presently to be described the removable straight-edge or blade is provided with a groove near one edge thereof; said groove extending the length of the blade. Parallel with the hypotenuse of the head is a recess of sufficient depth to accommodate two sliding plates which are adapted to have a certain longitudinal play in said recess. The plates lie one upon the other and have near their extremities upwardly projecting lips, one lip on one plate parallel with the shoulder formed by the recess at right angles to the hypotenuse, and the other lip parallel with the shoulder formed by the groove along one right angle side. Each of these sliding plates is provided with a perforation, as is also the main plate composing the head. When these plates are at the farthest limit of their longitudinal play, the perforation in one, say the top sliding plate, will be slightly to the left. It will now be readily understood that when a tapering plug or bolt is passed through the perforation in the sliding plates, and through the perforations in the head, and forced in, said plug or bolt will have a tendency to force the plates and the lips thereon together, that is, bring the lips on each nearer the before mentioned shoulders. This mechanism provides a means of rigidly securing the rule in either recess against the said shoulders, and as the plug or bolt is provided on its under portion with a thumb nut, the sliding plates may be held against the rule, or loosened as desired. On the under surface of the head is an adjustable screw to hold the blade in any desired position. The head may be provided with another recess in which a spirit level may be adjusted and secured by the top plate.

Having now generally set forth the essential principles of my invention, I shall proceed to describe the same more in detail in connection with the accompanying drawings, although I am not limited to the precise construction shown.

Figure I is a top view with the blade inserted for use as a T or center square. Fig. II shows the manner of securing the blade at any angle. Fig. III a top view with the blade adjusted for a miter or try-square. Fig. IV the head with the top plate removed. Fig. V a detail of the top plate. Fig. VI an edge view. Figs. VII and VIII details of the sliding plates. Fig. IX an enlarged sectional view of its head in lines $x$ $x$ of Fig. III.

The plate $a$ having top plate $a'$ is cut out at $a^2$ and has a depression $a^3$ in which a hermetically sealed glass tube containing alcohol and a bubble may rest, said tube enabling the tool to serve as a spirit level. The cutting away of portion $a^4$ leaves a projecting portion $a^5$, the edges $a^6$ $a^7$ of which serve as shoulders against which the rule $b$ is guided and is to be pressed. Groove or slot $c$ contains the two sliding plates $d$ $e$ lying one upon the other and having lips $d'$ $e'$. Perforations $d^2$ $e^2$ are provided in these sliding plates, the perforation $d^2$ where the plates are separated being to the left of perforation $e^2$. A tapering bolt $f$, either round, or square, as desired, is inserted in these perforations and through hole $a^8$. It will be observed that a complete insertion of this bolt $f$ will by bearing of the tapering portion upon perforations $d^2$ and $e^2$ force the plates together, carrying lips $d'$ $e'$ toward shoulder $a^6$ $a^7$. When the blade is inserted to act either as a T-square, as shown in Fig. I, or as a miter square, shown in Fig. II, the lips $d'$ $e'$ will engage the groove in the rule and by closing nut $g$ the lips will firmly hold the rule in place. Perforation $i$ in the blade accommodates adjusting screw $k$ by which the blade can be set at any desired angle.

It will be observed that I have devised a tool which can be readily changed from a T to a center bevel or try-square, and that in so doing several tools are combined in one. The blade being capable of sliding back and forth in the head may be shortened or lengthened for use in contracted spaces, and has many other advantages which will be evident to a mechanic having occasion to use the same.

Having thus described the nature of my invention, and explained a way of constructing and using the same, though without attempting to set forth all of the forms in which it may be made, or all of the modes of its employment, I declare that what I claim is—

1. A combination tool—comprising a head preferably in the shape of a right angle triangle, a blade or straight edge adapted to be inserted along one right angle side, or at right angles to the hypotenuse of said right angled head; recesses in said head to accommodate said blade and sliding plates having upwardly projecting lips adapted to engage a groove in said rule whereby said rule is clamped in position, substantially as described.

2. In a combination tool, the head $a$ having shoulder $a^6$ $a^7$, a blade adapted to be supported in said head, plates $d$ $e$ having lips $d'$ $e'$ adapted to engage a slot in said blade, said plates having perforations located over a perforation in the head, a tapering stud adapted to be passed through said plates and head, and an adjusting nut whereby said plates and lips are forced toward each other to lock said blade against the shoulder formed by the recesses, substantially as described.

3. In a combination tool, a head having recesses and a top plate, a blade or straight edge adapted to be inserted in said head at different angles, sliding plates having lips and perforations, said perforations adapted to be engaged by a tapering stud whereby said lips are pressed against a groove in said blade or straight edge, substantially as described.

4. In a combination tool, a recess or pocket, a head having a removable frame adapted to cover said pocket and form a center square, a blade or straight edge adapted to be inserted at different angles between said head and frame, and a spirit level inserted in said pocket and held in place by the removable plate, substantially as described.

5. In a combination tool, the combination of a blade or straight edge having a groove therein, and sliding plates having perforations for the insertion of a tapering stud whereby the plates are moved toward and held against shoulders to clamp said blade or straight edge, substantially as described.

6. A combination tool comprising in its construction a head, shoulders on said head, sliding plates whereby a blade is clamped against said shoulders, a perforation in said blade and a clamping screw on the reverse side of said head whereby said blade is set at any desired angle, substantially as described.

In testimony whereof I have signed my name to this specification, in the presence of two subscribing witnesses, this 11th day of April, A. D. 1892.

H. K. AUSTIN.

Witnesses:
C. F. BROWN,
A. D. HARRISON.